United States Patent
Nilsson

(10) Patent No.: US 12,068,833 B2
(45) Date of Patent: Aug. 20, 2024

(54) BEAM SWEEPING FOR SSB POLARIZATION SWITCHING

(71) Applicant: Telefonaktiebolaget LM Ericsson (publ), Stockholm (SE)

(72) Inventor: Andreas Nilsson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 159 days.

(21) Appl. No.: 17/635,131

(22) PCT Filed: Aug. 6, 2020

(86) PCT No.: PCT/SE2020/050769
§ 371 (c)(1),
(2) Date: Feb. 14, 2022

(87) PCT Pub. No.: WO2021/029812
PCT Pub. Date: Feb. 18, 2021

(65) Prior Publication Data
US 2022/0329313 A1    Oct. 13, 2022

Related U.S. Application Data

(60) Provisional application No. 62/886,721, filed on Aug. 14, 2019.

(51) Int. Cl.
*H04K 1/10*    (2006.01)
*H04B 7/06*    (2006.01)
(Continued)

(52) U.S. Cl.
CPC ........... *H04B 7/088* (2013.01); *H04B 7/0695* (2013.01); *H04B 7/10* (2013.01)

(58) Field of Classification Search
CPC ........ H04B 7/088; H04B 7/0695; H04B 7/10; H04B 7/0617
(Continued)

(56) References Cited

U.S. PATENT DOCUMENTS

2009/0252140 A1    10/2009    Imaeda
2019/0387417 A1    12/2019    Nilsson et al.
2021/0028839 A1*    1/2021    Oteri .................... H04B 7/0617

FOREIGN PATENT DOCUMENTS

WO    2018064348 A1    4/2018

OTHER PUBLICATIONS

Author Unknown, "Technical Specification Group Radio Access Network; NR; Radio Resource Control (RRC) protocol specification (Release 15)," Technical Specification 38.331, Version 15.6.0, Jun. 2019, 3GPP Organizational Partners, 517 pages.
(Continued)

*Primary Examiner* — Phuong Phu
(74) *Attorney, Agent, or Firm* — Sage Patent Group

(57) ABSTRACT

Systems and methods for beam selection for communication with a Transmit/Receive Point (TRP) are provided. In some embodiments, a method performed by a wireless device for beam selection for communication with a TRP includes: determining how the TRP changes a polarization state for a series of Synchronization Signal Block (SSB) bursts; sweeping through candidate Receive (RX) beams during SSB reception using an order based on how the TRP changes the polarization state; and combining channel measurements from sweeping through the candidate RX beams to determine a target RX beam of the candidate RX beams. In this way, wireless device beam selection can be improved which will improve Downlink (DL) performance. In case the wireless device has beam correspondence, the wireless device RX beam is also likely to be used as the Uplink (UL) Transmit (TX) beam, and in that case UL performance will also be improved.

16 Claims, 20 Drawing Sheets

(51) Int. Cl.
  *H04B 7/08* (2006.01)
  *H04B 7/10* (2017.01)
  *H04L 27/28* (2006.01)

(58) Field of Classification Search
  USPC ............................... 375/260, 267, 299, 347
  See application file for complete search history.

(56) References Cited

OTHER PUBLICATIONS

Tateishi, et al., "Indoor Experiment on 5G Radio Access Using Beam Tracking at 15GHz Band," 27th Annual PIMRC, IRACON 2016, IEEE, 6 pages.
International Search Report and Written Opinion for International Patent Application No. PCT/SE2020/050769, mailed Oct. 16, 2020, 18 pages.

* cited by examiner

BEAM SWEEPING FOR SSB POLARIZATION SWITCHING

RELATED APPLICATIONS

This application is a 35 U.S.C. § 371 national phase filing of International Application No. PCT/SE2020/050769, filed Aug. 6, 2020, which claims the benefit of provisional patent application Ser. No. 62/886,721, filed Aug. 14, 2019, the disclosures of which are hereby incorporated herein by reference in their entireties.

TECHNICAL FIELD

The present disclosure relates to beam selection and polarization switching.

BACKGROUND

FIG. 1 is a schematic diagram of the structure of a Synchronization Signal Block (SSB). The SSB is a broadcast signal in New Radio (NR) that helps with for example providing initial synchronization, basic system information used for initial access, mobility measurements and beam management. As can be seen in FIG. 1, the SSB includes a Primary Synchronization Signal (PSS), a Secondary Synchronization Signal (SSS), and a Physical Broadcast Channel (PBCH). The PSS and SSS part of the SSB are transmitted over 127 sub-carriers, where the sub-carrier spacing could be 15/30 kilohertz (kHz) for below 6 gigahertz (GHz) and 120/240 kHz for above 6 GHz.

FIG. 2 is a schematic diagram of SSBs needed to cover a cell in a low carrier frequency application and a high carrier frequency application. For low frequencies it is expected that each cell transmits one SSB that covers the whole cell (as illustrated on the left side of FIG. 2), while for higher frequencies it is expected that several beamformed SSBs are needed to attain coverage over the whole cell (as illustrated on the right side of FIG. 2). The max number of SSBs per cell is: below 3 GHz=4; 3-6 GHz=8; and above 6 GHz=64. The SSBs are transmitted in a SSB transmission burst which could last up to 5 milliseconds (ms). The periodicity of the SSB burst is configurable with the following options: 5, 10, 20, 40, 80, 160 ms.

FIG. 3 is a flow diagram of a handover process in NR for a User Equipment (UE) being handed over from a source NR base station (gNB) to a target gNB. It is expected in NR that mobility (i.e., cell selection) is based on SSB. A Channel State Information Reference Signal (CSI-RS) could also be configured for mobility measurements, however, that would require extra overhead compared to using SSB, since SSB are always transmitted for initial access and synchronization purposes. The mobility measurements are based on Reference Signal Received Power (RSRP) measurements performed on the SSS of the SSB. The RSRP measurements from a respective cell are filtered using Layer 3 filtering (as specified in section 5.5.3.3 in 3GPP 38.331) and can be seen in Equation 1:

$$F_n = (1-a)^* F_{n-1} + a^* M_n \quad \text{Equation 1}$$

where $M_n$ is the latest received measurement, $F_n$ is the updated filtered measurement result and, $F_{n-1}$ is the old filtered measurement result. The parameter a defines how much of the latest measurement should be weighted compared to older measurements.

With a reasonable parameter setting of a, the mobility measurement used for cell-selection is filtered over time to get rid of fast fading effects that could cause ping pong effects (e.g., unwanted handovers that move a UE back and forth between two or more cells). The reporting of the mobility measurements from the UE to the Transmission/Reception Point (TRP) in NR can be either periodic or event based. For periodic reporting, the TRP configures the UE to report the mobility measurements periodically for all neighboring cells detected on the associated frequency (the UE reporting up to "maxCellReport" number of cells).

For event triggered reporting, the UE is configured to report mobility measurements for all cells defined by the parameter "triggeredCellsList" (again up to "maxCellReport" number of cells). The event trigger report is signaled from the UE when a number of criteria are met. There are six different event triggers A1-A6 for NR as described in section 5.5.4 in 3GPP 38.331. The basic idea of the criteria is that the UE sends an event triggered mobility report when the mobility measurements for a neighboring cell are stronger than the serving cell mobility measurements+a certain threshold (the threshold is used to reduce ping pong effects). In case the TRP detects (through a UE mobility report) that a neighboring cell is stronger than the serving cell, it can initiate the handover process as illustrated in FIG. 3. As can be seen, a handover process requires significant signaling overhead and unnecessary handovers should be avoided as much as possible.

FIG. 4 is a schematic diagram of beam management in a NR cellular communication cell. Narrow beam transmission and reception schemes will be needed at higher frequencies to compensate for higher propagation loss. A suitable TRP Transmit (TX) beam for each UE is expected to be discovered and monitored by the network using measurements on downlink reference signals used for beam management, i.e., CSI-RS or SSB (CSI-RS and SSB have been agreed in 3GPP to be used as beam reference signal for New Radio (NR)). The CSI-RS for beam management can be transmitted periodically, semi-persistently, or aperiodically (event triggered), and they can be either shared between multiple UEs or be UE-specific. The SSBs are transmitted periodically and are shared for all UEs. In order to find a suitable TRP beam, the TRP transmits CSI-RS/SSBs in different TRP TX beams on which the UE performs RSRP measurements and reports back the N best TRP TX beams (where N can be configured by the network).

It is expected that a periodic TRP TX beam sweep utilizing beams with rather large beamwidth and with reference signals that is shared between all UEs in the cell will be used to determine a coarse first direction for the UEs. One suitable solution for such periodic TRP TX beam sweep is to use the SSB as the beam reference signal. One reason for that is that SSBs are transmitted periodically (for initial access/cell selection/synchronization purposes) and it is also expected to be beamformed at higher frequencies to overcome the higher propagation losses.

It is expected that UEs at higher frequencies will also have analog beamforming. During initial access, before the UE has any spatial information about where the TRP is located, it is expected that the UE will use a wide beam to achieve as omnidirectional coverage as possible. After the initial access, it is preferred that the UE finds a narrower UE receive (RX) beam in order to increase signal path gain. One way to do this is to let the TRP initiate a UE RX beam sweep procedure based on CSI-RS, in which the TRP transmits a burst of CSI-RS in a fixed TRP TX beam such that the UE can sweep through different UE RX beams, measure RSRP of each UE RX beam, and select the best one. One problem with this solution is that it requires extra overhead.

An alternative way to adjust the UE RX beam without extra overhead signaling is to let the UE evaluate different UE RX beams during the periodic SSB transmission after the initial access. Since each SSB consists of Orthogonal Frequency Division Multiplexing symbols, a maximum of four UE RX beams can be evaluated during each SSB burst transmission.

It is expected that most transmissions (data/control/reference signals) in millimeter wave (mmWave) for NR will have a spatial Quasi Co-Location (QCL) relationship (for Downlink (DL)) and spatial relation (in Uplink (UL)) to an SSB. For these systems, it is expected that the UE will determine its UE RX beam based on SSB transmissions.

FIG. 5 is a graphical representation of measured RSRP for three different beams in two polarizations. One drawback with determining the UE RX beam based on SSB transmission is that an SSB only has one port, and hence only is transmitted over one polarization, which means that the UE will only know how suitable the different candidate UE RX beams are for one polarization. In case the RSRP differs significantly for different polarizations, there is a risk that a sub-optimal UE RX beam is chosen by the UE. Measurements have shown that different polarizations can have different best beams. For example, the result illustrated in FIG. 5 shows that, in Non-Line-of-Sight (NLOS), the strongest beam in one polarization is the weakest beam in the orthogonal polarization.

In addition, some UE manufacturers have tried to forbid switching the polarization of SSB beams between consecutive bursts because the received power differs too much between the two polarizations so that the UE may have problems with Automatic Gain Control (AGC). However, it will be argued by network vendors that this is something that UE manufacturers need to be able to handle.

FIG. 6 is a schematic diagram of SSB beams where the polarization state of the SSBs is changed between consecutive SSB bursts. Since SSB beams are used for cell-selection and the path gain can differ significantly between different polarizations, it is expected that at least some networks will change the polarization state of the SSBs between consecutive SSB burst transmissions. An example is illustrated in FIG. 6, where vertical polarization is used for the first SSB burst transmission, horizontal polarization is used for the second SSB burst transmission, vertical polarization is used for the third SSB burst transmission, and so on. By doing this, the UE will base the cell-selection on received SSB beams from two orthogonal polarizations (since cell-selection measurements are filtered over time), which means that the cell-selection will be more reliable.

Measurements indicate that traffic is constituted by a mix of many small packets and few large packets, where the small packets greatly outnumber the large packets. Because the small packets might come with some time distance, it is expected that UEs will stay in connected mode for up to 10 seconds after the buffer is emptied to try to minimize the overhead needed when going from idle/inactive mode to/from connected mode.

There currently exist certain challenge(s). A UE performing UE RX beam training on an SSB beam without knowing how the TRP changes the polarizations of the SSBs might lead to sub-optimal UE RX beam selections. As such, improved systems and methods for beam selection are needed.

SUMMARY

Systems and methods for beam selection for communication with a Transmit/Receive Point (TRP) are provided. In some embodiments, a method performed by a wireless device for beam selection for communication with a TRP includes: determining how the TRP changes a polarization state for a series of Synchronization Signal Block (SSB) bursts; sweeping through candidate Receive (RX) beams during SSB reception using an order based on how the TRP changes the polarization state; and combining channel measurements from sweeping through the candidate RX beams to determine a target RX beam of the candidate RX beams. In this way, wireless device beam selection can be improved, which will improve Downlink (DL) performance. In case the wireless device has beam correspondence, the wireless device RX beam is also likely to be used as the Uplink (UL) Transmit (TX) beam, and in that case UL performance will also be improved.

Certain aspects of the present disclosure and their embodiments may provide solutions to the aforementioned or other challenges. In one embodiment, the UE determines if/when the TRP changes a polarization state for SSBs based on statistics of SSB measurements. Based on this information (e.g., how the TRP changes the polarization state for SSBs), the UE determines in which order to sweep through the candidate UE RX beams during SSB reception and how to combine Reference Signal Received Power (RSRP) results from different SSB bursts.

In another embodiment, the TRP signals to the UE how it changes the polarization state of the SSB beams. Based on this information, the UE determines in which order to sweep through the different candidate UE RX beams during SSB bursts and how to combine the resulting RSRP measurements from multiple SSB bursts.

In another embodiment, the UE assumes (without prior knowledge) that the TRP changes the polarization state of SSBs for consecutive SSB bursts, and based on this information, the UE determines in which order to sweep through the different candidate UE RX beams during SSB bursts and how to combine the resulting RSRP measurements from multiple SSB bursts. In case most networks change polarization every SSB burst, this method might be preferred, since it is very simple and requires no extra statistical collection of SSB measurements or signaling from the TRP.

There are, proposed herein, various embodiments which address one or more of the issues disclosed herein. One embodiment relates to a method performed by a wireless device for beam selection for communication with a TRP. The method includes determining how the TRP changes a polarization state for a series of SSB bursts and sweeping through candidate RX beams during SSB reception using an order based on how the TRP changes the polarization state. The method further includes combining channel measurements from sweeping through the candidate RX beams to determine a first target RX beam of the candidate RX beams.

Certain embodiments may provide one or more of the following technical advantage(s). For example, embodiments can improve UE RX beam selection, which will improve DL performance. In case the UE has beam correspondence, the UE RX beam is also likely to be used as the UL TX beam, and in that case UL performance will also be improved.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
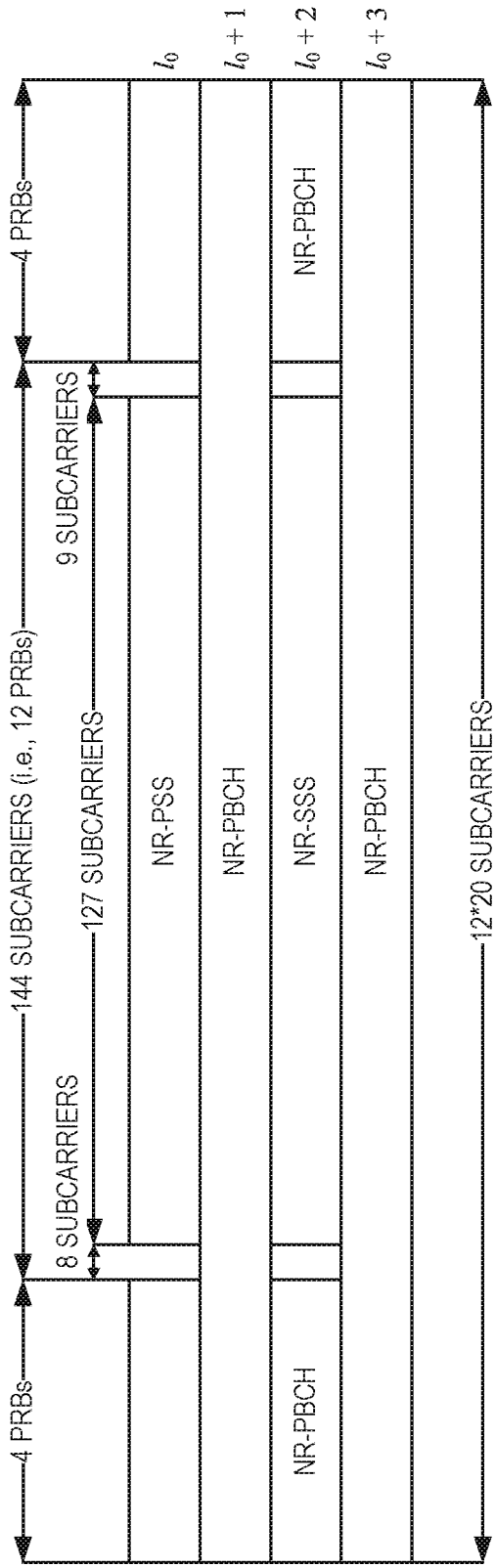
FIG. 1 is a schematic diagram of the structure of a Synchronization Signal Block (SSB)
Figure 2:
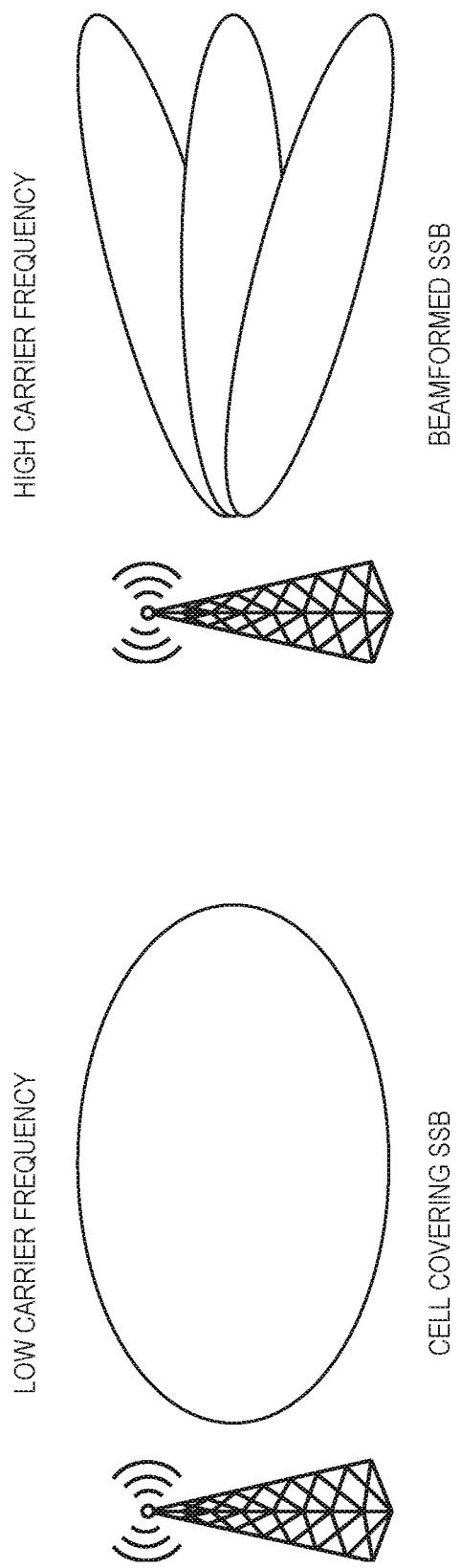
FIG. 2 is a schematic diagram of SSBs needed to cover a cell in a low carrier frequency application and a high carrier frequency application.
Figure 3:
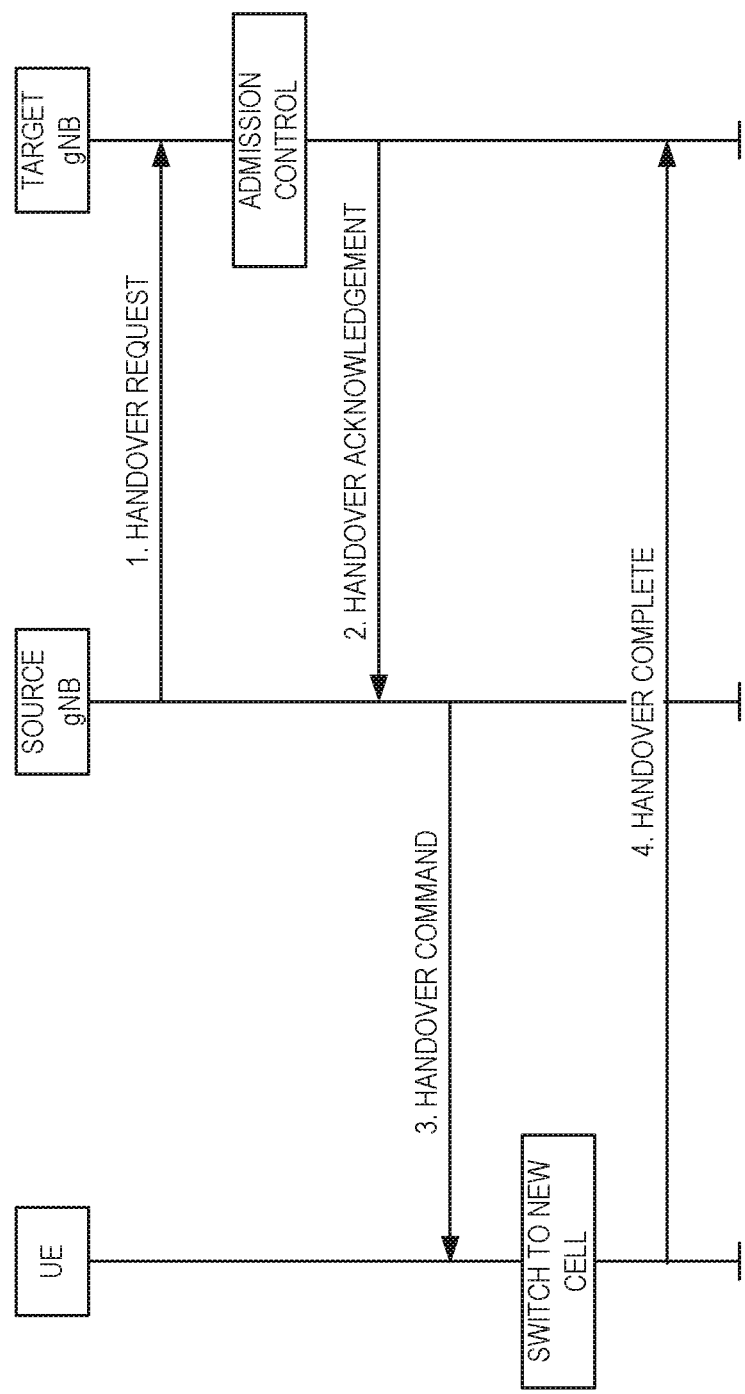
FIG. 3 is a flow diagram of a handover process in NR for a User Equipment (UE) being handed over from a source NR base station (gNB) to a target gNB.
Figure 4:
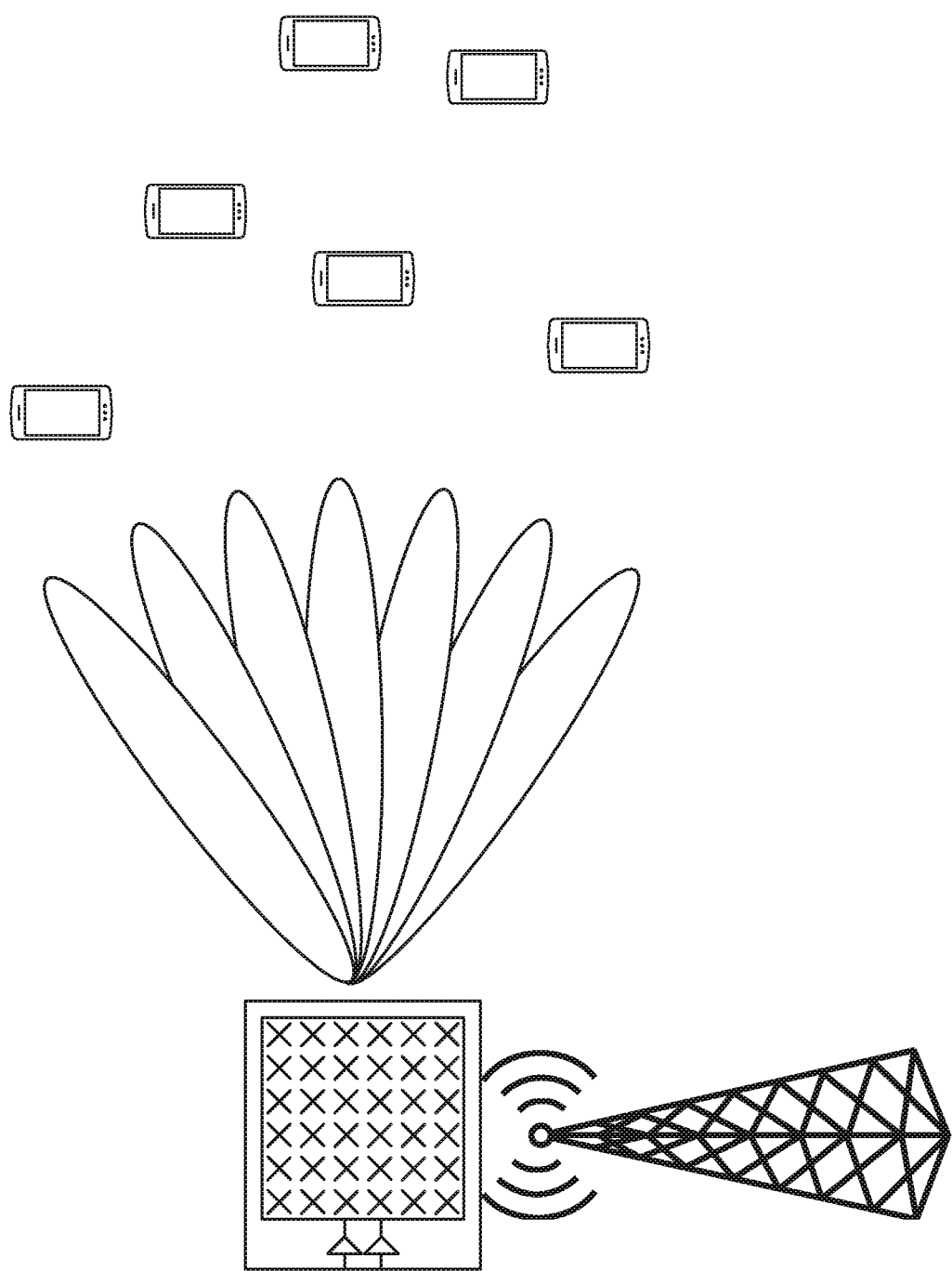
FIG. 4 is a schematic diagram of beam management in a NR cellular communication cell.
Figure 5:
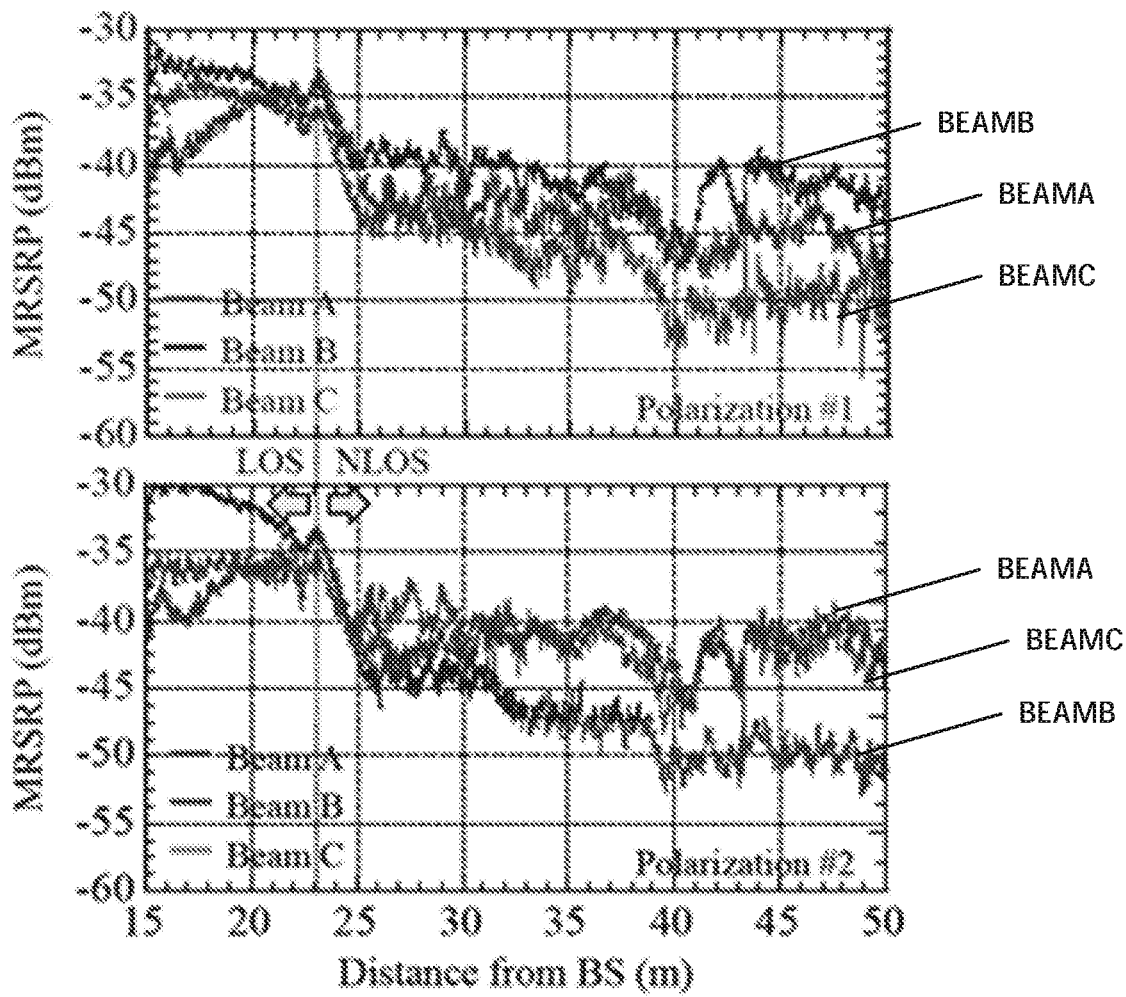
FIG. 5 is a graphical representation of measured RSRP for three different beams in two polarizations.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 7:
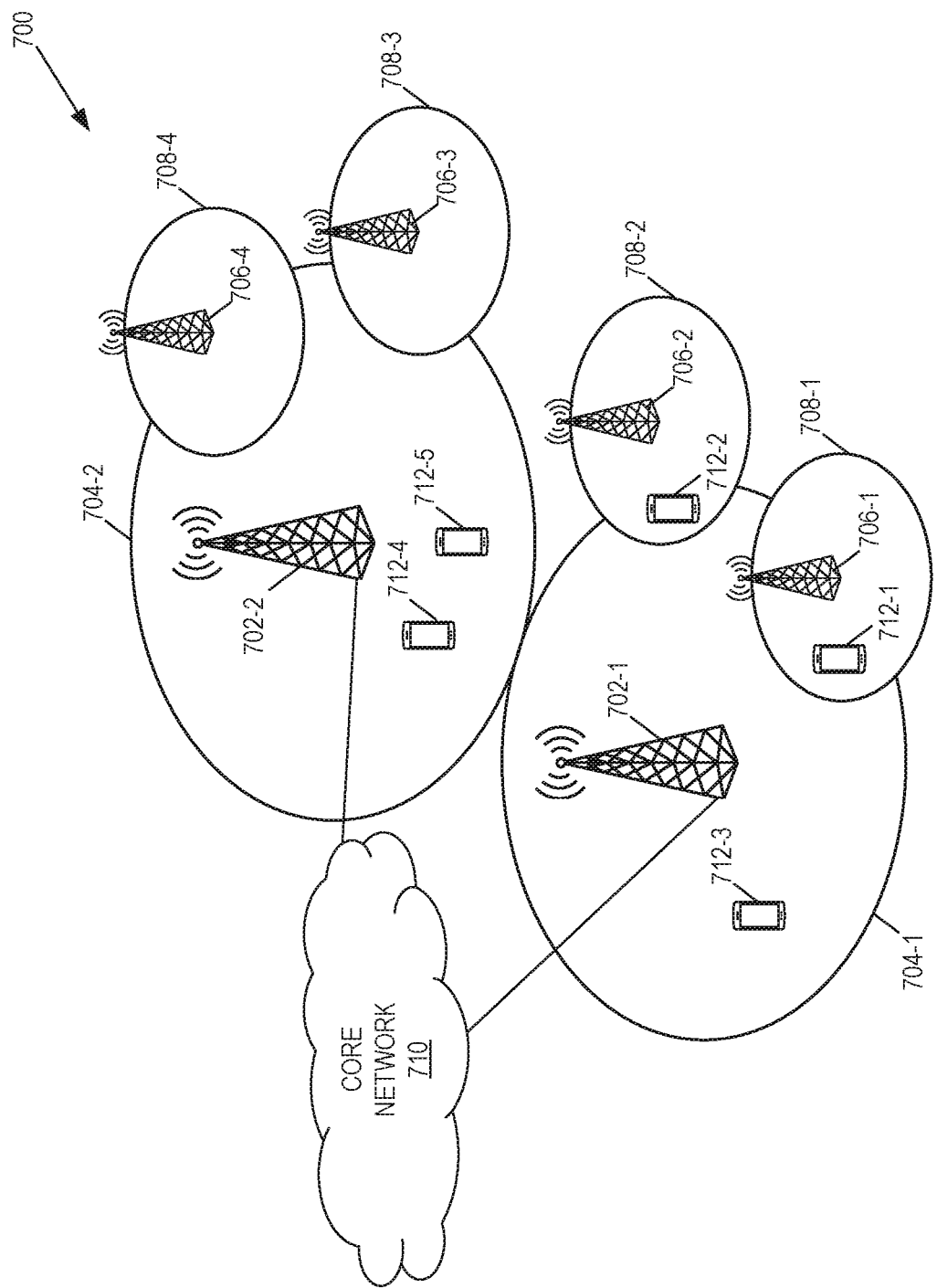
FIG. 7 illustrates one example of a cellular communications system in which embodiments of the present disclosure may be implemented.

FIG. 7 illustrates one example of a cellular communications system 700 in which embodiments of the present disclosure may be implemented. In the embodiments described herein, the cellular communications system 700 is a 5G system (5GS) including a NR Radio Access Network (RAN) or an Evolved Packet System (EPS) including a LTE RAN. In this example, the RAN includes base stations 702-1 and 702-2, which in LTE are referred to as eNBs and in 5G NR are referred to as gNBs, controlling corresponding (macro) cells 704-1 and 704-2. The base stations 702-1 and 702-2 are generally referred to herein collectively as base stations 702 and individually as base station 702. Likewise, the (macro) cells 704-1 and 704-2 are generally referred to herein collectively as (macro) cells 704 and individually as (macro) cell 704. The RAN may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The cellular communications system 700 also includes a core network 710, which in the 5GS is referred to as the 5G core (5GC).

The base stations 702 (and optionally the low power nodes 706) are connected to the core network 710.

The base stations 702 and the low power nodes 706 provide service to wireless devices 712-1 through 712-5 in the corresponding cells 704 and 708. The wireless devices 712-1 through 712-5 are generally referred to herein collectively as wireless devices 712 and individually as wireless device 712. The wireless devices 712 are also sometimes referred to herein as UEs.

A User Equipment (UE) (such as a wireless device 712) performing UE Receive (RX) beam training on an Synchronization Signal Block (SSB) beam without knowing how the Transmit/Receive Point (TRP) changes the polarizations of the SSBs might lead to sub-optimal UE RX beam selections.

For example, assume that the UE has one panel with four candidate UE RX beams. In case the UE is unaware that the TRP switches the polarization between consecutive SSB bursts (as illustrated in FIG. 6), the UE might think that a new UE RX beam is preferred every burst, even though that variation of the best UE RX beam between different SSB bursts is only due to polarization mismatching.

Figure 6:
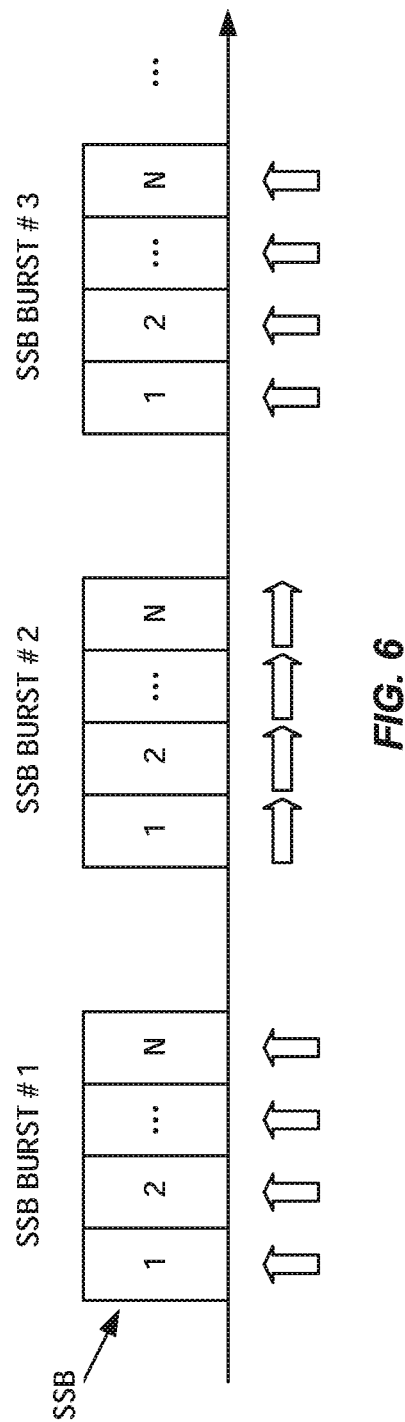
FIG. 6 is a schematic diagram of SSB beams where the polarization state of the SSBs is changed between consecutive SSB bursts.

In another example, assume that the UE has one panel with eight candidate UE RX beams and that the TRP switches polarization between consecutive SSB bursts (as illustrated in FIG. 6). In a default case (assuming that the UE will sequentially sweep through the eight UE RX beams in two consecutive SSB bursts) the first four candidate UE RX beams will always be evaluated for the first polarization, and the last four UE RX beams will only be evaluated for a second polarization, which might lead to sub-optimal UE RX beam selections, due to polarization mismatching.

Systems and methods for beam selection for communication with a TRP are provided. In some embodiments, a method performed by a wireless device for beam selection for communication with a TRP includes: determining how the TRP changes a polarization state for a series of SSB bursts; sweeping through candidate RX beams during SSB reception using an order based on how the TRP changes the polarization state; and combining channel measurements from sweeping through the candidate RX beams to determine a target RX beam of the candidate RX beams. In this way, wireless device beam selection can be improved which will improve Downlink (DL) performance. In case the wireless device has beam correspondence, the wireless device RX beam is also likely to be used as the Uplink (UL) Transmit (TX) beam, and in that case UL performance will also be improved.

In some embodiments, the polarization state is either a horizontal or a vertical polarization. Changing polarization states could be changing from a horizontal polarization to a vertical polarization or the other way around. In some embodiments, a candidate RX beam is a beam which might be used for receiving. In some embodiments, the target RX beam is the beam that the wireless device will use to receive DL transmissions and is chosen from the candidate RX beams.

Figure 8:
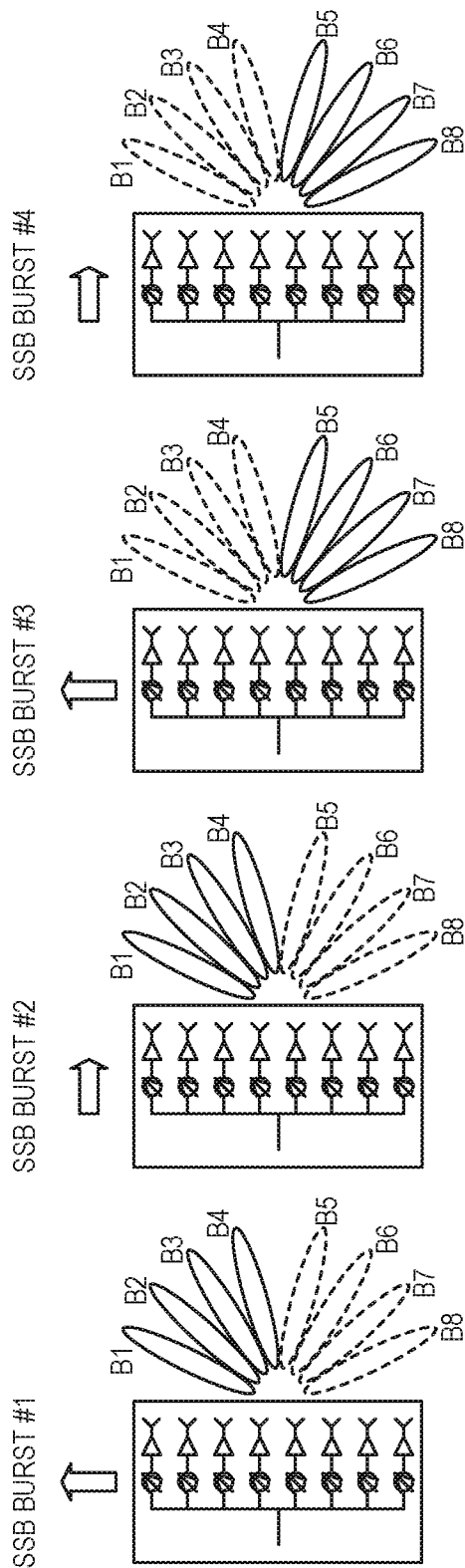
FIGS. 8 through 11 are schematic diagrams of a UE transmitting a series of SSB bursts, according to some embodiments of the present disclosure.

FIG. 8 is a schematic diagram of a UE transmitting a series of SSB bursts according to one embodiment. In this embodiment, the UE is equipped with one UE panel with eight candidate beams (B1-B8). While the examples discussed herein relate to one UE panel, the embodiments discussed herein also relate to more than one UE panel. The UE has determined that the TRP switch polarization of SSBs every consecutive SSB burst (for example based on statistical measurements on how the RSRP changes between different SSB bursts, or based on signaling from the Base Station (BS)) and therefore sweeps the four first candidate beams (B1-B4) both during the first SSB burst and during the second SSB burst (to attain measurements for both polarizations). The UE then combines (or makes an average of) the measured RSRP from the two SSB bursts for each UE beam to calculate a resulting RSRP value per candidate UE beam. During the third and fourth SSB bursts the UE sweeps through the remaining four candidate beams (B5-B8). The UE combines (or makes an average of) the measured RSRP from the third and fourth SSB bursts for each of the candidate beams (B5-B8). In the next step the UE compares the resulting RSRP for all eight candidate beams and selects the best candidate beam to be used for further communication.

For example, if data transmission is scheduled between the first SSB burst and the second SSB burst, the UE will use the UE RX beam that was best from B1-B4. If data is scheduled between the second SSB burst and the third SSB burst, the UE should apply the UE RX beam with the best combined RSRP for B1-B4. If data is scheduled between the third SSB burst and the fourth SSB burst, the UE can compare the resulting RSRP for B1-B4 with the RSRP for one polarization for B5-B8 and select the beam with the highest RSRP. If data is scheduled after the fourth SSB burst, the UE should compare the resulting RSRP for all eight candidate beams (B1-B8) and select the beam with the highest resulting RSRP (which then takes both polarizations into account and hence gets rid of the polarization mismatch).

Figure 9:
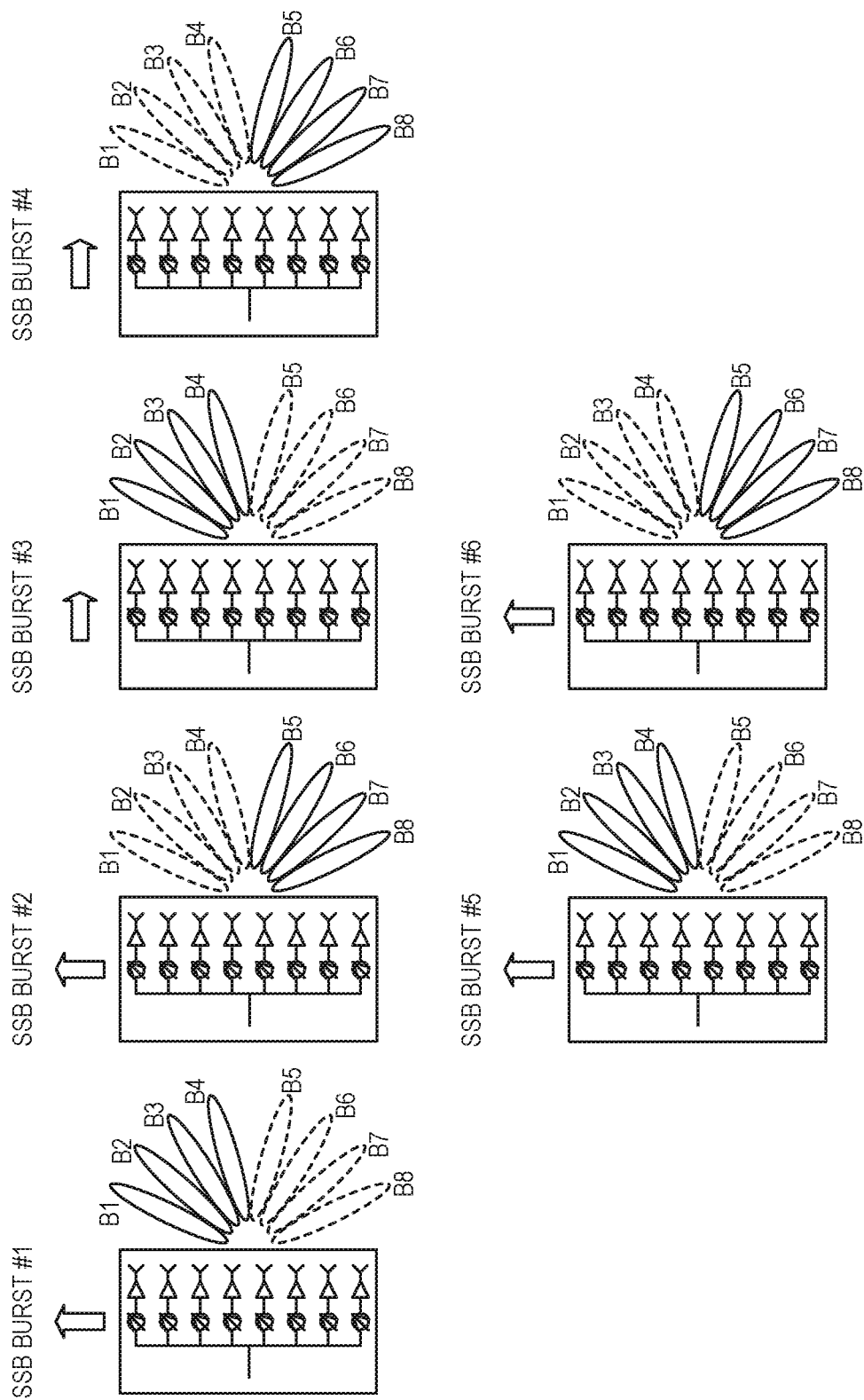

FIG. 9 is a schematic diagram of a UE transmitting a series of SSB bursts according to another embodiment. In this embodiment, the TRP transmits the same polarization in two consecutive SSB bursts. One reason for this could be that the UE RX beam sweep gets better, or due to technological limitations, or another potential reason. For this embodiment, the UE will always sweep through different UE RX beams for every SSB burst. This means that even if the UE has been scheduled for data between the second SSB burst and the third SSB burst, the UE would still have swept through all UE RX beams (even though only for one polarization). In this case the UE will combine the RSRP for every second SSB burst (e.g., for the first SSB burst and the third SSB burst), in order to get measurements for each candidate UE RX beam for both polarizations.

Figure 10:
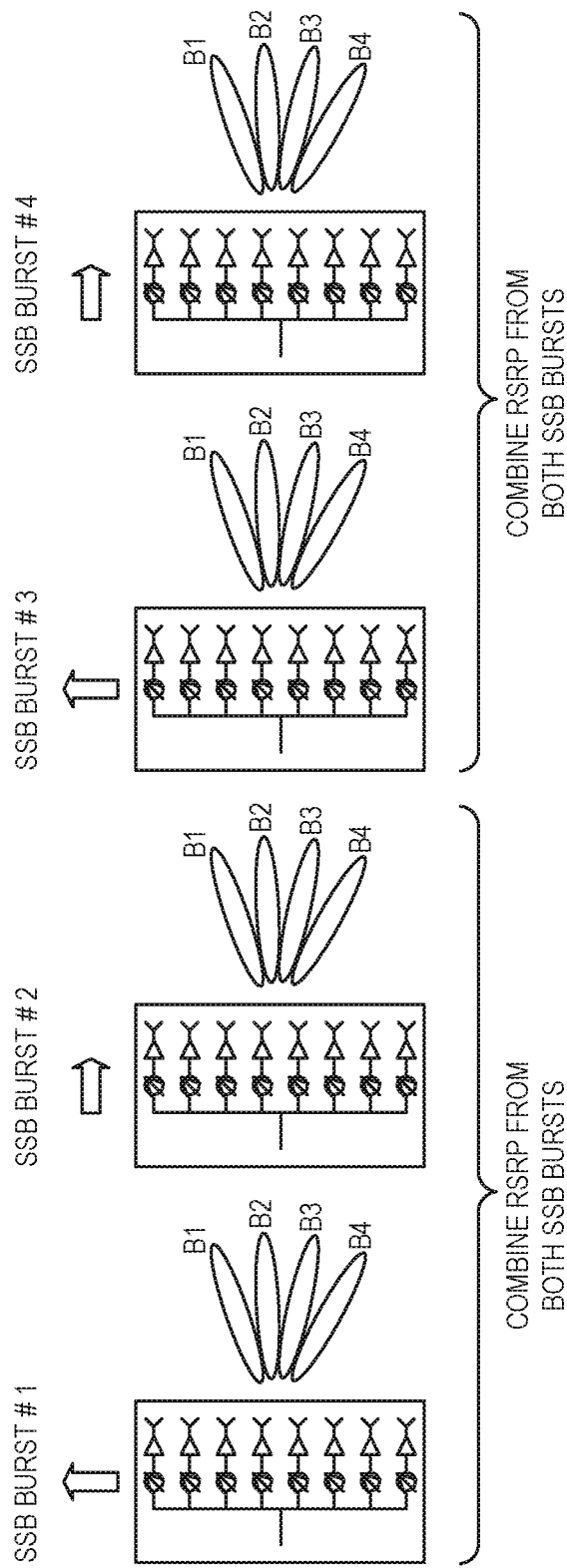

FIG. 10 is a schematic diagram of a UE transmitting a series of SSB bursts according to another embodiment. In this embodiment, the UE has one UE panel with four candidate beams. In addition, the UE has determined how the TRP switches the polarization of SSBs for different SSB bursts, and the UE uses this information to determine how to combine the RSRP from the different SSB burst. In this example, the UE can combine RSRP from SSBs from two consecutive SSB bursts.

Figure 11:
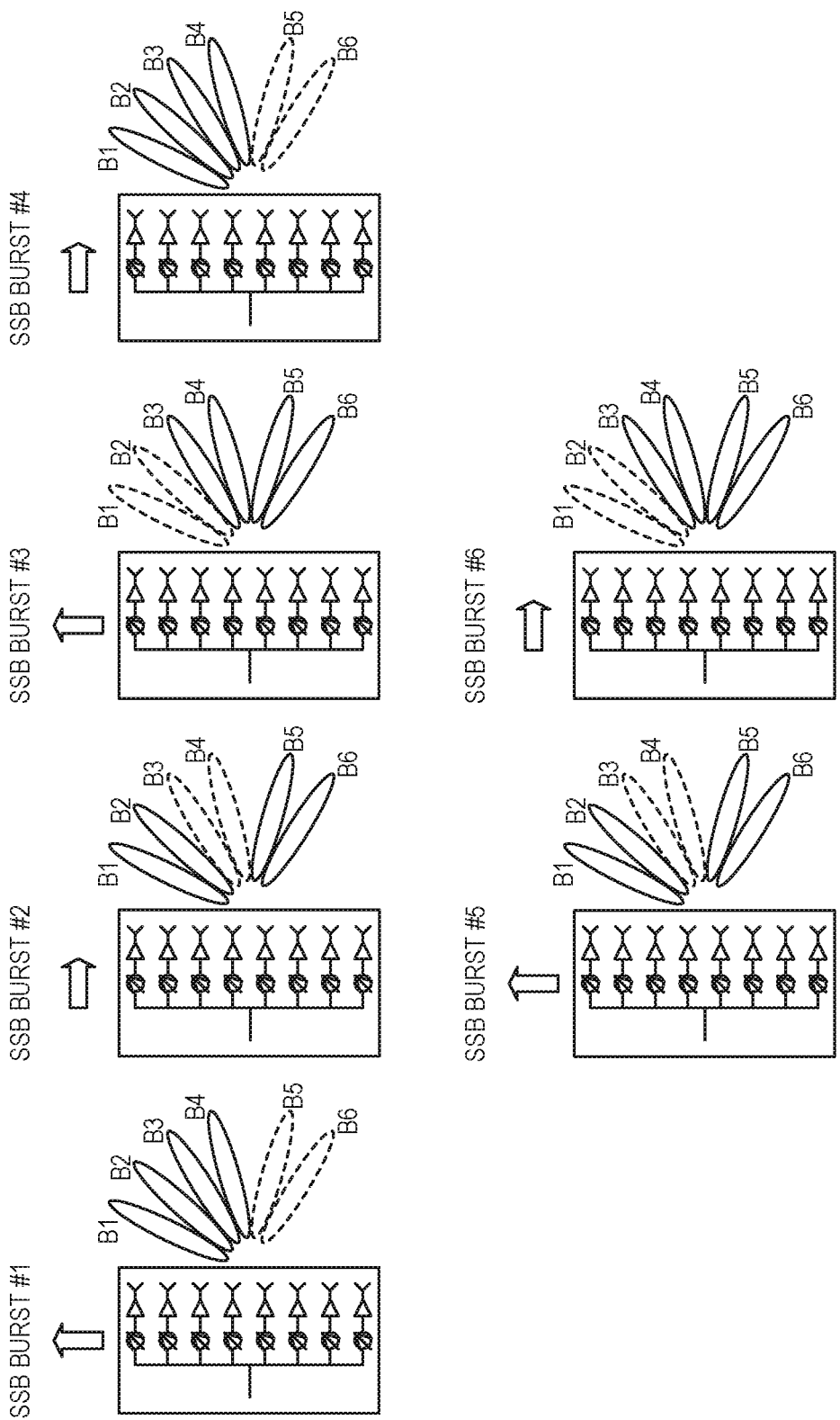

FIG. 11 is a schematic diagram of a UE transmitting a series of SSB bursts according to another embodiment. In this embodiment, the UE has six candidate beams. In this case, the UE should make sure that it combines RSRPs from different SSB bursts such that at least one RSRP measurement per polarization is used for each candidate beam. In this example, the UE can combine RSRP measurements for the first SSB burst and the second SSB burst for candidate beams B1 and B2, combine RSRP measurements for the second SSB burst and the third SSB burst for candidate beams B5 and B6, and combine RSRP measurements for the third SSB burst and the fourth SSB burst for candidate beams B3 and B4.

In some examples, one of the approaches described above is used by a UE in the connected state even when the UE currently has no data to receive/transmit (i.e., buffers are empty). In some examples, one of the approaches is used by the UE when the UE is on connected or idle state. In this way, the UE can determine a suitable UE RX beam even before it comes into a Radio Resource Control (RRC) connected state.

In some examples, the UE assumes that the TRP change polarization of SSB beams between every second SSB burst (since this is likely to be the most common case). This is expected to only have a small degradation in performance in case the TRP does not switch polarization between the different SSB bursts (due to a delay of one SSB burst time interval for evaluating some of the candidate UE beams, in case the UE has more than four candidate UE beams).

Figure 12:
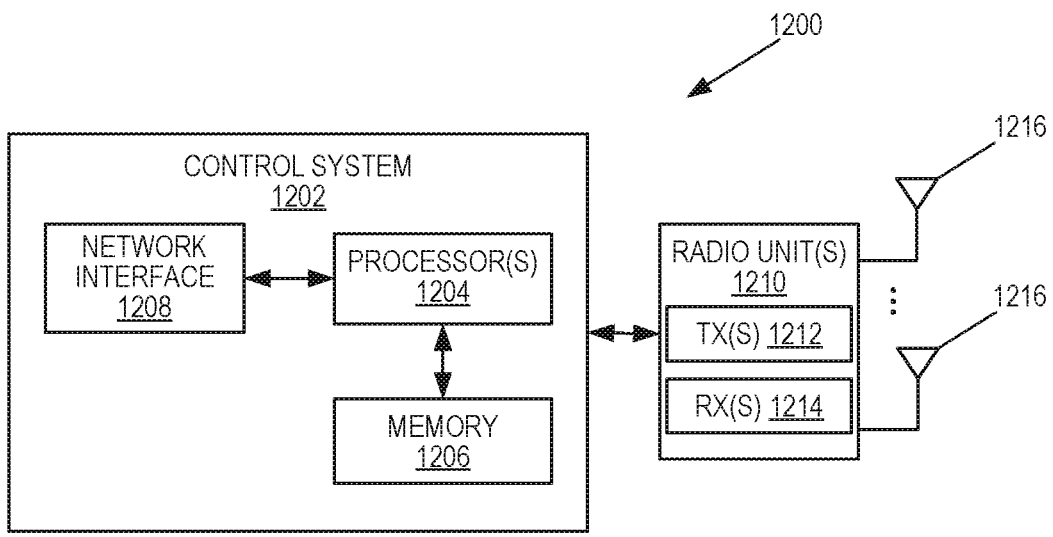
FIG. 12 is a schematic block diagram of a radio access node, according to some embodiments of the present disclosure.

FIG. 12 is a schematic block diagram of a radio access node 1200 according to some embodiments of the present disclosure. The radio access node 1200 may be, for example, a base station 702 or 706. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the radio access node 1200 includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 as described herein. In some embodiments, the function(s) are implemented in software that is stored, e.g., in the memory 1206 and executed by the one or more processors 1204.

Figure 13:
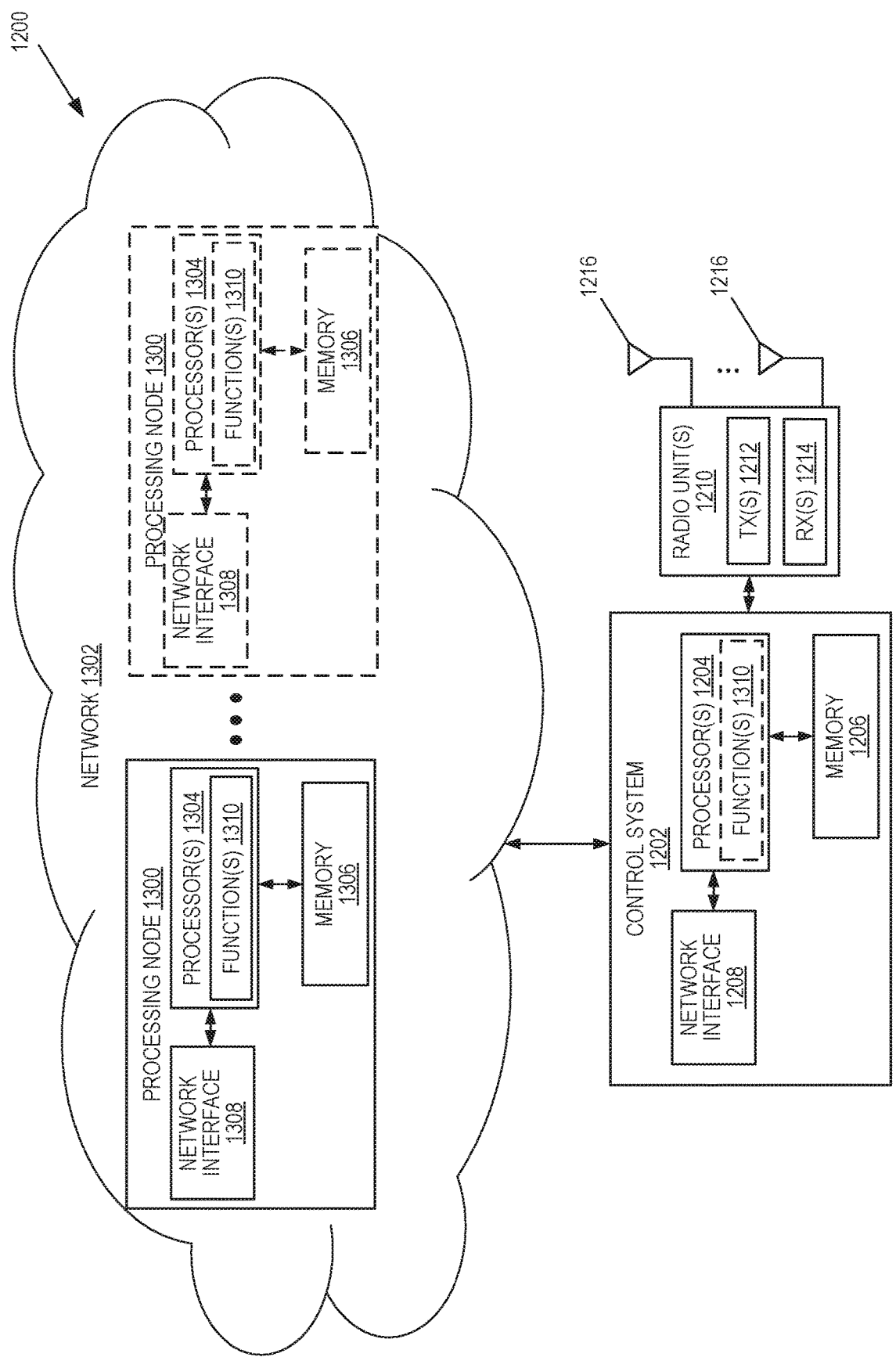
FIG. 13 is a schematic block diagram that illustrates a virtualized embodiment of the radio access node, according to some embodiments of the present disclosure.

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the radio access node 1200 described herein are implemented at the one or more processing nodes 1300 or distributed across the control system 1202 and the one or more processing nodes 1300 in any desired manner. In some particular embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of radio access node 1200 or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
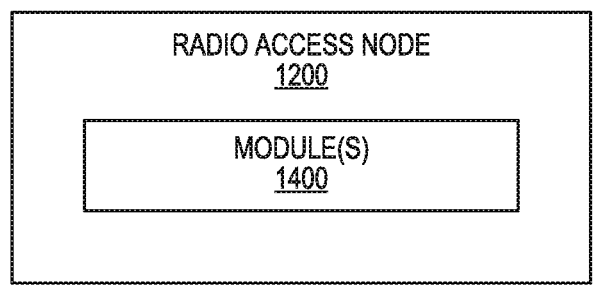
FIG. 14 is a schematic block diagram of the radio access node, according to some other embodiments of the present disclosure.

FIG. 14 is a schematic block diagram of the radio access node 1200 according to some other embodiments of the present disclosure. The radio access node 1200 includes one or more modules 1400, each of which is implemented in software. The module(s) 1400 provide the functionality of the radio access node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
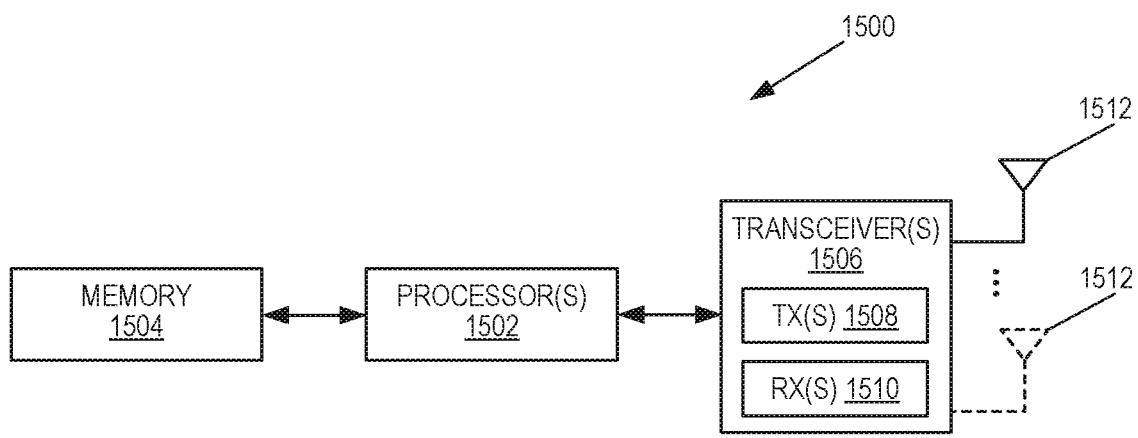
FIG. 15 is a schematic block diagram of a UE, according to some embodiments of the present disclosure.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
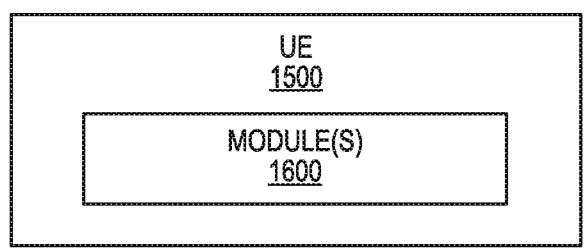
FIG. 16 is a schematic block diagram of the UE, according to some embodiments of the present disclosure.

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Figure 17:
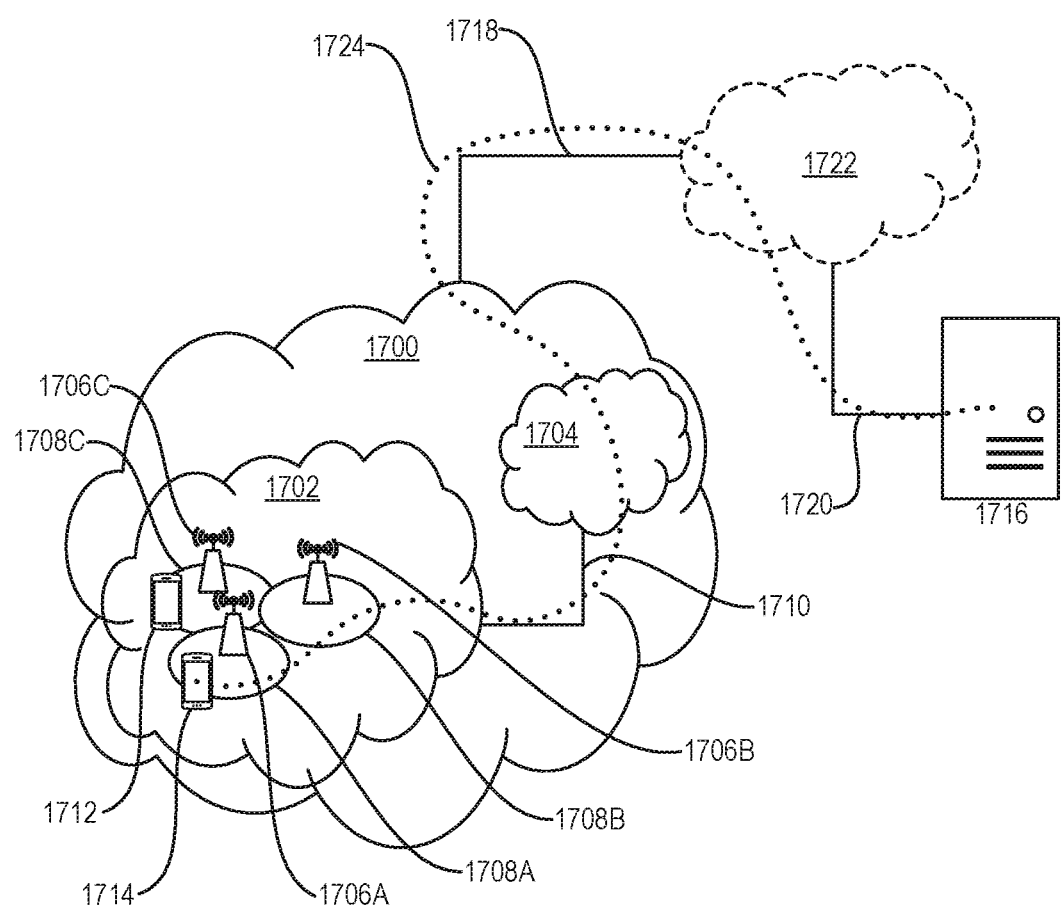
FIGS. 17 and 18 illustrate examples of a cellular communications system, according to some embodiments of the present disclosure.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as Node Bs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
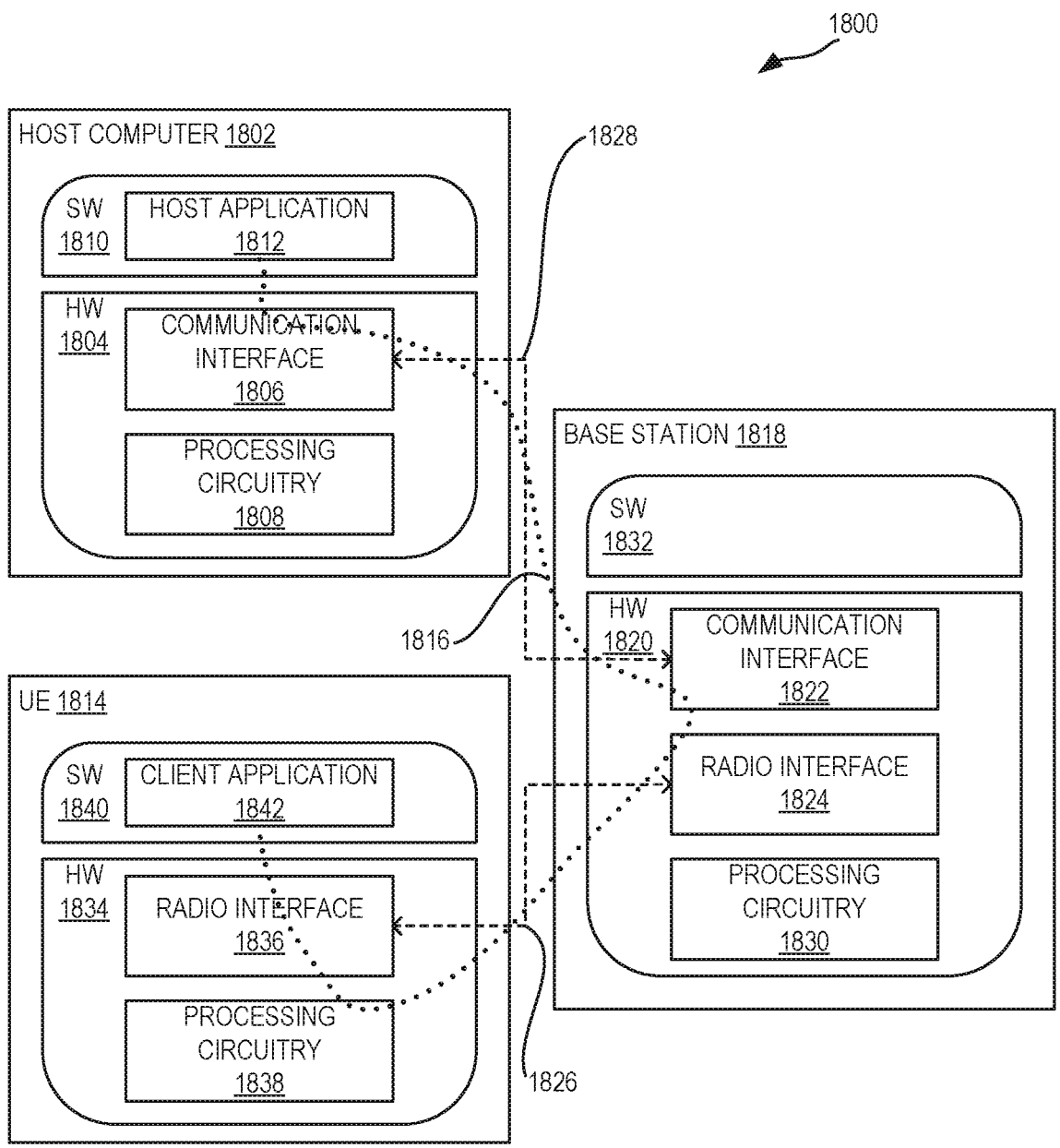

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment. More precisely, the teachings of these embodiments may improve the reliability of UE RX beam selection and thereby provide benefits such as improved DL and/or UL performance.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

Figures 19, 20:
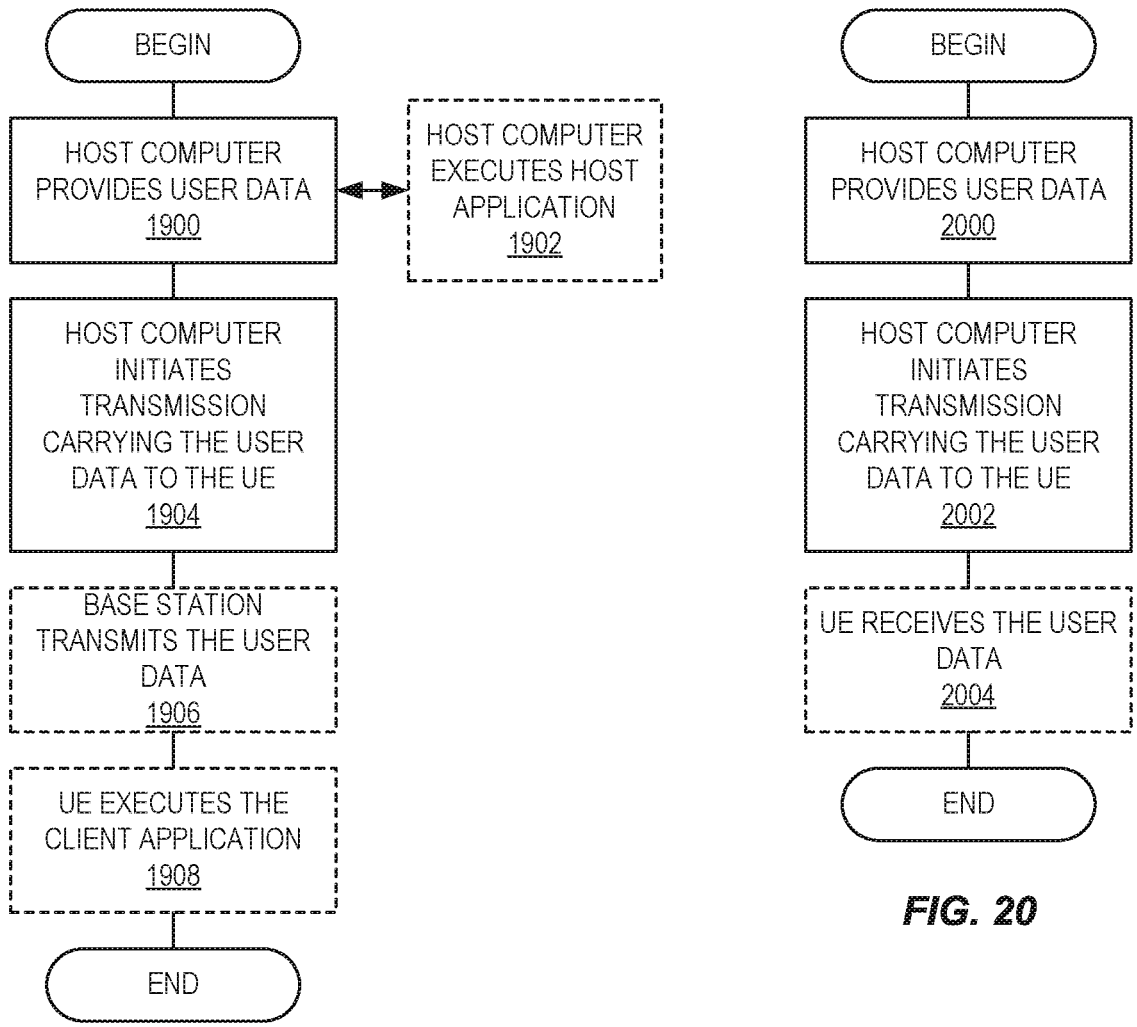
FIGS. 19 through 22 are flowcharts illustrating methods implemented in a communication system, according to some embodiments of the present disclosure.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

Figures 21, 22:
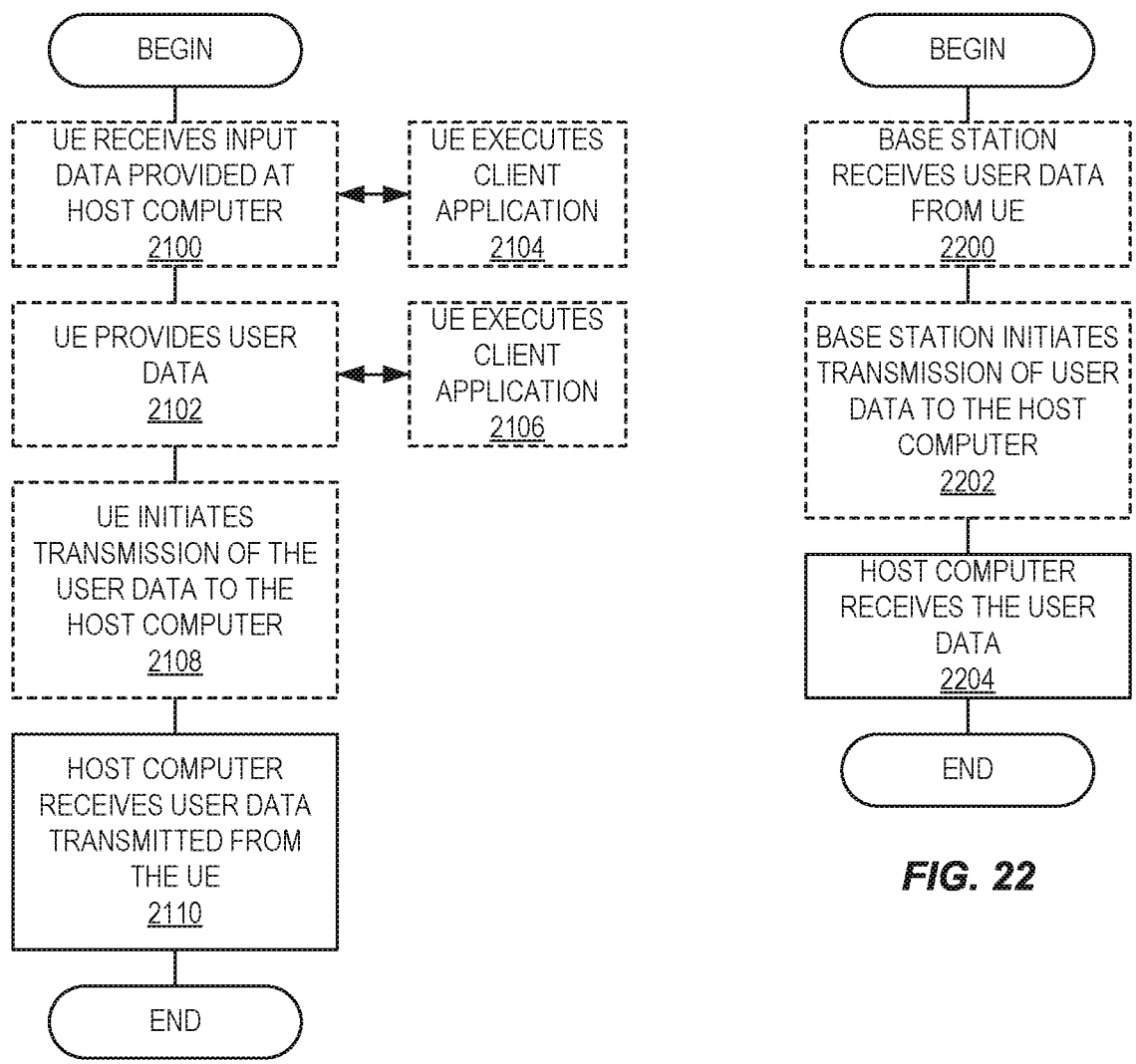

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Figure 23:
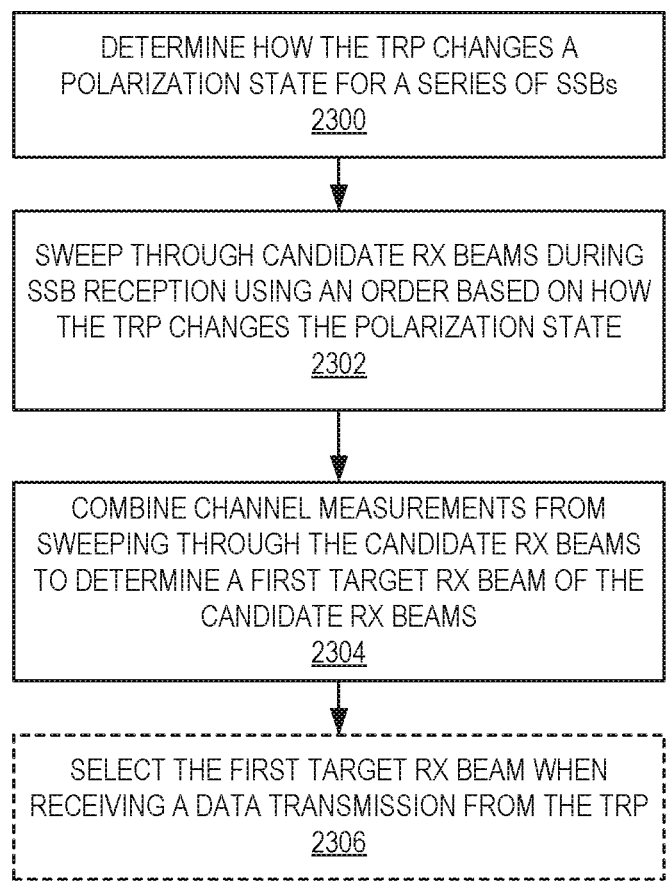
FIGS. 23 and 24 are flowcharts illustrating methods in accordance with particular embodiments.

FIG. 23 is a flowchart illustrating a method in accordance with particular embodiments. This method may be performed by a UE. The method begins at step 2300 with determining how the TRP changes a polarization state for a series of SSB bursts. The method also includes step 2302 with sweeping through candidate RX beams during SSB reception using an order based on how the TRP changes the polarization state. The method also includes step 2304 with combining channel measurements from sweeping through the candidate RX beams to determine a first target RX beam of the candidate RX beams. The target RX beam can then be used for further communications with the TRP. For example, the method can optionally include step 2306 with selecting the first target RX beam when receiving a data transmission from the TRP.

Figure 24:
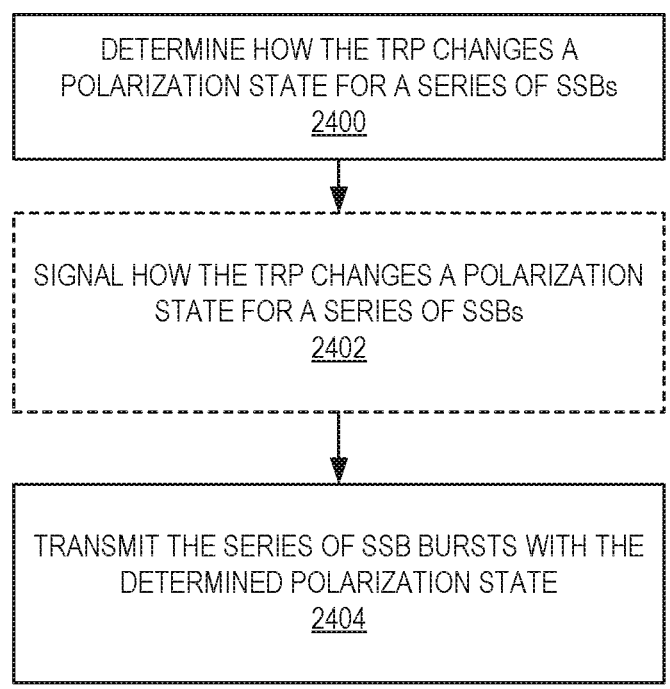

FIG. 24 is a flowchart illustrating a method in accordance with particular embodiments. This method may be performed by a TRP such as a base station. The method begins at step 2400 with determining how the TRP changes a polarization state for a series of SSB bursts. The method optionally includes step 2402 with signaling how the TRP changes a polarization state for the series of SSB bursts. The method also includes step 2404 with transmitting the series of SSB bursts with the determined polarization state.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for beam selection for communication with a transmit/receive point, TRP, the method comprising one or more of:
—determining how the TRP changes a polarization state for a series of synchronization signal block, SSB, bursts;
—sweeping through candidate receive, RX, beams during SSB reception using an order based on how the TRP changes the polarization state; and —combining channel measurements from sweeping through the candidate RX beams to determine a target RX beam of the candidate RX beams.

Embodiment 2: The method of embodiment 1, wherein determining how the TRP changes the polarization state for the series SSB bursts is based on statistics of channel measurements from past SSB bursts.

Embodiment 3: The method of embodiment 2, wherein combining the channel measurements is based on the statistics of channel measurements from past SSB bursts.

Embodiment 4: The method of embodiment 1, wherein determining how the TRP changes the polarization state for the series SSB bursts comprises receiving signaling from the TRP.

Embodiment 5: The method of embodiment 4, wherein combining the channel measurements is based on the signaling from the TRP.

Embodiment 6: The method of embodiment 1, wherein determining how the TRP changes the polarization state for the series SSB bursts is based on assuming the TRP changes the polarization state for each consecutive SSB burst.

Embodiment 7: The method of any of embodiments 1 to 6, further comprising selecting the target RX beam when receiving one or more of a data transmission and a control transmission from the TRP.

Embodiment 8: The method of any of embodiments 1 to 7, wherein sweeping through the candidate RX beams comprises: —sweeping through each candidate RX beam of the candidate RX beams during SSB reception for a first polarization state; and —sweeping through each candidate RX beam of the candidate RX beams during SSB reception for a second polarization state.

Embodiment 9: The method of embodiment 8, further comprising: —sweeping through a first set of the candidate RX beams during a first SSB burst for the first polarization state; and —sweeping through a second set of the candidate RX beams during a second SSB burst for the first polarization state.

Embodiment 10: The method of embodiment 9, wherein combining the channel measurements comprises averaging the channel measurements from each of the first polarization state and the second polarization state and selecting the target RX beam having a highest averaged channel measurement.

Embodiment 11: The method of embodiment 9, wherein combining the channel measurements comprises summing the channel measurements from each of the first polarization state and the second polarization state and selecting the target RX beam having a highest summed channel measurement.

Embodiment 12: The method of any of embodiments 1 to 11, wherein the TRP changes between a first polarization state and a second polarization state orthogonal to the first polarization state.

Embodiment 13: The method of any of embodiments 1 to 12, wherein the method is performed when the wireless device is in a connected state and the wireless device has data to receive or transmit.

Embodiment 14: The method of any of embodiments 1 to 13, wherein the method is performed when the wireless device is in a connected state and the wireless device has no data to receive or transmit.

Embodiment 15: The method of any of embodiments 1 to 14, wherein the method is performed when the wireless device is in an idle state.

Embodiment 16: The method of embodiment 15, wherein the target RX beam is determined before the wireless device is in a radio resource control, RRC, connected state.

Embodiment 17: The method of any of the previous embodiments, further comprising: —providing user data; and —forwarding the user data to a host computer via the transmission to the base station.

Group B Embodiments

Embodiment 18: A wireless device for beam selection for communication with a transmit/receive point (TRP), the wireless device comprising: —processing circuitry configured to perform any of the steps of any of the Group A embodiments; and —power supply circuitry configured to supply power to the wireless device.

Embodiment 19: A User Equipment, UE, for beam selection for communication with a transmit/receive point (TRP), the UE comprising: —an antenna configured to send and receive wireless signals; —radio front-end circuitry connected to the antenna and to processing circuitry, and configured to condition signals communicated between the antenna and the processing circuitry; —the processing circuitry being configured to perform any of the steps of any of the Group A embodiments; —an input interface connected to the processing circuitry and configured to allow input of information into the UE to be processed by the processing circuitry; —an output interface connected to the processing circuitry and configured to output information from the UE that has been processed by the processing circuitry; and —a battery connected to the processing circuitry and configured to supply power to the UE.

Embodiment 20: A communication system including a host computer comprising: —processing circuitry configured to provide user data; and —a communication interface configured to forward user data to a cellular network for transmission to a User Equipment, UE; —wherein the UE comprises a radio interface and processing circuitry, the UE's components configured to perform any of the steps of any of the Group A embodiments.

Embodiment 21: The communication system of the previous embodiment, wherein the cellular network further includes a base station configured to communicate with the UE.

Embodiment 22: The communication system of the previous 2 embodiments, wherein: —the processing circuitry of the host computer is configured to execute a host application, thereby providing the user data; and —the UE's processing circuitry is configured to execute a client application associated with the host application.

Embodiment 23: A method implemented in a communication system including a host computer, a base station, and a User Equipment, UE, the method comprising: —at the host computer, providing user data; and —at the host computer, initiating a transmission carrying the user data to the UE via a cellular network comprising the base station, wherein the UE performs any of the steps of any of the Group A embodiments.

Embodiment 24: The method of the previous embodiment, further comprising at the UE, receiving the user data from the base station.

Embodiment 25: A communication system including a host computer comprising: —communication interface configured to receive user data originating from a transmission from a User Equipment, UE, to a base station; —wherein the UE comprises a radio interface and processing circuitry, the UE's processing circuitry configured to perform any of the steps of any of the Group A embodiments.

Embodiment 26: The communication system of the previous embodiment, further including the UE.

Embodiment 27: The communication system of the previous 2 embodiments, further including the base station, wherein the base station comprises a radio interface configured to communicate with the UE and a communication interface configured to forward to the host computer the user data carried by a transmission from the UE to the base station.

Embodiment 28: The communication system of the previous 3 embodiments, wherein: —the processing circuitry of the host computer is configured to execute a host application; and —the UE's processing circuitry is configured to execute a client application associated with the host application, thereby providing the user data.

Embodiment 29: The communication system of the previous 4 embodiments, wherein: —the processing circuitry of the host computer is configured to execute a host application, thereby providing request data; and —the UE's processing circuitry is configured to execute a client application associated with the host application, thereby providing the user data in response to the request data.

Embodiment 30: A method implemented in a communication system including a host computer, a base station, and a User Equipment, UE, the method comprising: —at the host computer, receiving user data transmitted to the base station from the UE, wherein the UE performs any of the steps of any of the Group A embodiments.

Embodiment 31: The method of the previous embodiment, further comprising, at the UE, providing the user data to the base station.

Embodiment 32: The method of the previous 2 embodiments, further comprising: —at the UE, executing a client application, thereby providing the user data to be transmitted; and —at the host computer, executing a host application associated with the client application.

Embodiment 33: The method of the previous 3 embodiments, further comprising: —at the UE, executing a client application; and —at the UE, receiving input data to the client application, the input data being provided at the host computer by executing a host application associated with the client application; —wherein the user data to be transmitted is provided by the client application in response to the input data.

Embodiment 34: A method implemented in a communication system including a host computer, a base station, and a User Equipment, UE, the method comprising: —at the host computer, receiving, from the base station, user data originating from a transmission which the base station has received from the UE, wherein the UE performs any of the steps of any of the Group A embodiments.

Embodiment 35: The method of the previous embodiment, further comprising at the base station, receiving the user data from the UE.

Embodiment 36: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AGC Automatic Gain Control
AF Application Function
AMF Access and Mobility Function
AP Access Point
ASIC Application Specific Integrated Circuit
AUSF Authentication Server Function
CPU Central Processing Unit
CSI-RS Channel State Information Reference Signal
DL Downlink
DSP Digital Signal Processor
eNB Enhanced or Evolved Node B
EPS Evolved Packet System
FPGA Field Programmable Gate Array
GHz Gigahertz
gNB New Radio Base Station
HSS Home Subscriber Server
kHz Kilohertz
LTE Long Term Evolution
MME Mobility Management Entity
ms Millisecond
MTC Machine Type Communication
NEF Network Exposure Function
NF Network Function
NLOS Non-Line-Of-Sight
NR New Radio
NRF Network Function Repository Function
NSSF Network Slice Selection Function
OTT Over-the-Top
PBCH Physical Broadcast Channel
PCF Policy Control Function
P-GW Packet Data Network Gateway
PSS Primary Synchronization Signal
QCL Quasi Co-Located
RAM Random Access Memory
RAN Radio Access Network
ROM Read Only Memory
RRC Radio Resource Control
RRH Remote Radio Head
RSRP Reference Signal Received Power
RTT Round Trip Time
RX Receive
SCEF Service Capability Exposure Function
SMF Session Management Function
SSB Synchronization Signal Block
SSS Secondary Synchronization Signal
TRP Transmit/Receive Point
TX Transmit
UDM Unified Data Management
UE User Equipment
UL Uplink
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless device for beam selection for communication with a Transmit/Receive Point (TRP), the method comprising:
   determining how the TRP changes a polarization state for a series of Synchronization Signal Block (SSB) bursts;
   sweeping through candidate Receive (RX) beams during SSB reception using an order based on how the TRP changes the polarization state, wherein sweeping through the candidate RX beams comprises:
   sweeping through each candidate RX beam of the candidate RX beams during SSB reception for a first polarization state;
   sweeping through each candidate RX beam of the candidate RX beams during SSB reception for a second polarization state;
   sweeping through a first set of the candidate RX beams during a first SSB burst for the first polarization state; and
   sweeping through a second set of the candidate RX beams during a second SSB burst for the first polarization state; and
   combining channel measurements from sweeping through the candidate RX beams to determine a target RX beam of the candidate RX beams, wherein combining the channel measurements comprises:
   averaging the channel measurements from each of the first polarization state and the second polarization state; and
   selecting the target RX beam having a highest averaged channel measurement.

2. The method of claim 1, wherein determining how the TRP changes the polarization state for the series of SSB bursts is based on statistics of channel measurements from past SSB bursts.

3. The method of claim 2, wherein combining the channel measurements is based on the statistics of channel measurements from the past SSB bursts.

4. The method of claim 1, wherein determining how the TRP changes the polarization state for the series of SSB bursts comprises receiving signaling from the TRP.

5. The method of claim 4, wherein combining the channel measurements is based on the signaling from the TRP.

6. The method of claim 1, wherein determining how the TRP changes the polarization state for the series of SSB bursts is based on assuming the TRP changes the polarization state for each consecutive SSB burst.

7. The method of claim 1, further comprising:
   selecting the target RX beam when receiving one or more of a data transmission and a control transmission from the TRP.

8. The method of claim 1, wherein combining the channel measurements comprises:
   summing the channel measurements from each of the first polarization state and the second polarization state; and
   selecting the target RX beam having a highest summed channel measurement.

9. The method of claim 1, wherein the TRP changes between the first polarization state and the second polarization state orthogonal to the first polarization state.

10. The method of claim 1, wherein the method is performed when the wireless device is in a connected state and the wireless device has data to receive or transmit.

11. The method of claim 1, wherein the method is performed when the wireless device is in the connected state and the wireless device has no data to receive or transmit.

12. The method of claim 1, wherein the method is performed when the wireless device is in an idle state.

13. The method of claim 12, wherein the target RX beam is determined before the wireless device is in a radio resource control (RRC) connected state.

14. A method performed by a Transmit/Receive Point (TRP) for beam selection for communication with a wireless device, the method comprising:

determining how the TRP changes a polarization state for a series of Synchronization Signal Block (SSB) bursts; and transmitting the series of SSB bursts with the determined polarization state, wherein the wireless device sweeps through candidate Receive (RX) beams during reception of the SSB using an order based on how the TRP changes the polarization state, wherein sweeping through the candidate RX beams comprises:

sweeping through each candidate RX beam of the candidate RX beams during SSB reception for a first polarization state;

sweeping through each candidate RX beam of the candidate RX beams during SSB reception for a second polarization state;

sweeping through a first set of the candidate RX beams during a first SSB burst for the first polarization state; and sweeping through a second set of the candidate RX beams during a second SSB burst for the first polarization state, wherein the wireless device combines channel measurements from sweeping through the candidate RX beams to determine a target RX beam of the candidate RX beams, and wherein combining the channel measurements comprises:

averaging the channel measurements from each of the first polarization state and the second polarization state; and selecting the target RX beam having a highest averaged channel measurement.

15. The method of claim 14, further comprising:
signaling how the TRP changes the polarization state for the series of SSB bursts.

16. A wireless device for enabling transmission feedback, the wireless device comprising:
one or more processors; and
memory storing instructions executable by the one or more processors, whereby the wireless device is operable to:

determine how a Transmit/Receive Point (TRP) changes a polarization state for a series of Synchronization Signal Block (SSB) bursts;

sweep through candidate Receive (RX) beams during SSB reception using an order based on how the TRP changes the polarization state, wherein sweep through the candidate RX beams comprises:

sweep through each candidate RX beam of the candidate RX beams during SSB reception for a first polarization state;

sweep through each candidate RX beam of the candidate RX beams during SSB reception for a second polarization state;

sweep through a first set of the candidate RX beams during a first SSB burst for the first polarization state; and sweep through a second set of the candidate RX beams during a second SSB burst for the first polarization state; and combine channel measurements from sweeping through the candidate RX beams to determine a target RX beam of the candidate RX beams, wherein combine the channel measurements comprises:

average the channel measurements from each of the first polarization state and the second polarization state; and select the target RX beam having a highest averaged channel measurement.

* * * * *